PROCESS FOR PREPARING AMMONIUM AND ALKALI METAL SALTS OF RESINOUS CARBOXY ESTER-LACTONES

Louis M. Minsk, Rochester, N.Y., assignor to Eastman Kodak Company, Rochester, N.Y., a corporation of New Jersey
No Drawing. Filed Oct. 16, 1961, Ser. No. 145,435
4 Claims. (Cl. 260—78.3)

This invention relates to resinous carboxy ester-lactones that are soluble in aqueous solutions and to a process for preparing the same from interpolymers of unsaturated $\alpha,\beta$-dicarboxylic acids or their anhydrides and vinyl organic acid esters. More particularly, the invention relates to alkali metal and ammonium salts of such resinous carboxy ester-lactones and use thereof in the photographic art.

This application is a continuation-in-part of my co-pending application Serial No. 772,725, filed November 10, 1958, now U.S. Patent No. 3,007,901.

The interpolymers ordinarily prepared by polymerizing a mixture of an unsaturated $\alpha,\beta$-dicarboxylic acid anhydride with a vinyl organic acid ester are well known. Thus, polymerization of a mixture of maleic anhydride and vinyl acetate yields an interpolymer I which can be presented graphically as follows:

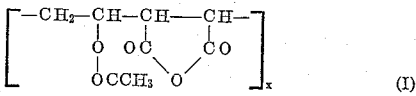

(I)

This interpolymer is brittle and insoluble in water but soluble in certain organic solvents such as acetone and pyridine. It can be saponified to give water soluble products or it can be hydrated with water to give a polymeric material II as follows:

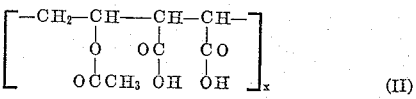

(II)

This hydrate II is in effect an interpolymer of vinyl acetate and maleic acid and is water soluble.

The interpolymers of this type have been modified by reacting them with a monohydric alcohol whereby the compound was de-acylated and esterified with the monohydric alcohol and simultaneously converted into a lactone. The resulting lactone esters are water insoluble, water intolerant and alkali insoluble, and find utility in applications where hydrophobic characteristics are necessary. Such resinous ester-lactones and their preparation are described in McNally et al. U. S. Patent 2,306,071.

It is an object of this invention to provide an improved method for modifying the physical and chemical characteristics of interpolymers of unsaturated $\alpha,\beta$-dicarboxylic acids or their anhydrides and vinyl organic acid esters.

Another object of the invention is to provide heteropolymers which have been modified by simultaneous reaction with a monohydric hydroxy acid and a monohydric alkanol.

Another object of the invention is to provide an effective method of forming a new class of mixed ester-lactone resins from vinyl acetate-maleic anhydride interpolymers.

Another object of the invention is to provide alkali-soluble, flexible mixed ester-lactone polymers by the reaction of monohydric hydroxy acid of the lactic acid series and a monohydric alkanol containing from 1–12 carbon atoms with an interpolymer of vinyl acetate and maleic anhydride.

Another object is to provide ammonium and alkali metal salts of the above new class of mixed ester-lactone resins from vinyl acetate-maleic anhydride interpolymers, wherein the original lactone rings remain substantially intact.

These and other objects are attained in accordance with this invention by the steps of (a) first heating to reacting temperature, under acid conditions, a heteropolymer of a vinyl or isopropenyl organic acid ester and an unsaturated $\alpha,\beta$-dicarboxylic acid with a mixture of a monohydric hydroxy acid and a monohydric alkanol to obtain a resinous carboxy ester-lactone comprised essentially of substantial proportions of each of the following recurring structural units:

(1)
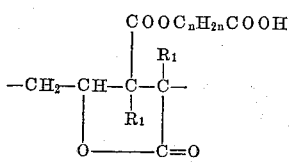

(2)
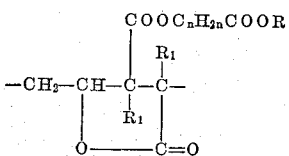

(3)
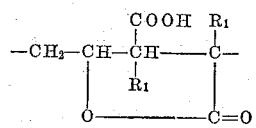

and (4)
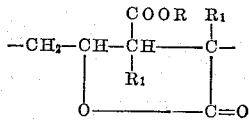

wherein $n$ represents an integer of from 1–5, R represents an alkyl group containing from 1-12 carbon atoms e.g. methyl, ethyl, propyl, isopropyl, butyl, hexyl, decyl, dodecyl, etc. groups or a phenyl-alkyl group wherein the alkyl group contains from 1–4 carbon atoms e.g. benzyl, phenylethyl, phenylpropyl, phenylbutyl etc. groups or the corresponding tolylalkyl groups and $R_1$ represents a hydrogen atom or a methyl group, and thus can be defined as mixed alkyl esters and carboxy esters of a monohydric hydroxy acid and a monohydric alkanol of a lactone of an interpolymer or vinyl alcohol and an unsaturated $\alpha,\beta$-dicarboxylic acid, and (b) then dispersing the isolated resinous carboxy ester-lactone in an appropriate solvent such as acetone and adding just sufficient alkaline reagent thereto to fix the pH of the solution at from 5–8, preferably from 6–7, whereby the inherently hydrophobic, unneutralized resinous carboxy ester-lactone is converted to the inherently hydrophilic alkali salt of the said resinous carboxy ester-lactone wherein the original lactone rings remain substantially intact. Suitable alkaline reagents include ammonium hydroxide and alkali metal hydroxides such as lithium, sodium, potassium, hydroxides, etc. The alkaline reagent displaces only the hydrogen of the carboxyl groups by the ammonium radical or alkali metal atom. All or only part of the free carboxyl groups, i.e. from about 15–100%, need be converted depending on the properties required in the final salt product. Where the starting resinous carboxy ester-lactone has a relatively low free carboxyl content, for example, equivalent to from 3–4 mls. of N NaOH solution/gram of resin, it is generally advantageous to convert most or all of the free carboxyl groups to the alkali salt radical, and where the starting free carboxyl content is relatively high, for example, equivalent to from 5–6.35 mls. of N NaOH solution/gram of resin, the conversion is advantageously carried out to convert about from 45–100% of the carboxyl groups to the alkali salt radical. Those members having the lower alkali salt radical content are less soluble and acetone solutions thereof gel on dilution with water. Accordingly, it will be understood from the preceding that the final resinous salts of the invention are comprised essentially of recurring structural units of above Formulas 2 and 4, some residual recurring units of above Formulas 1 and 3, and in addition the following recurring units:

(5)
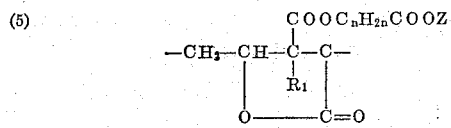

and (6)
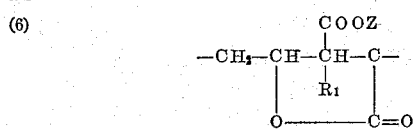

wherein $n$ and $R_1$ are as previously defined and Z represents a member selected from the group consisting of the ammonium radical ($-NH_4$) and an alkali metal atom.

In preparing the intermediate interpolymers represented by I and II above, the usual and preferred practice is to employ the anhydride of the acid rather than the free dicarboxylic acid itself. In the specification and claims, it will be understood that references to the unsaturated $\alpha,\beta$-dicarboxylic acid are intended to include the corresponding anhydride, that the vinyl alcohol is not usually employed as such but the interpolymer is prepared from a vinyl organic acid ester and such is intended to be within the scope of the invention as described herein and defined in the appended claims. When these interpolymers are reacted, in accordance with previously mentioned step (a), with a mixture of an aliphatic monohydric hydroxy acid and an alcohol of the formulas:

$$C_nH_{2n}(OH)(COOH)_x \text{ and } R-OH$$

wherein $n$ and $R$ are as previously defined and $x$ is 1 or 2 in accordance with this invention, the heteropolymer is de-acylated and then esterified with the hydroxy acid and alcohol to form a mixed alkyl ester and carboxy ester and the acid or anhydride groups simultaneously undergo an inner condensation into a lactone grouping. The proportions of the reacting components can advantageously range about from 15–30 parts by weight of the intermediate heteropolymer which is preferably a vinyl acetate-maleic anhydride heteropolymer, from 35–65 parts by weight of the monohydric hydroxy acid and from 10–45 parts by weight of the monohydric alcohol, the total weight of these components equalling 100 parts by weight in each combination.

The exact proportions of structural units (1), (2), (3), and (4) in the above step (a) of the process are not accurately known but considerable variation is possible depending on the relative amounts of monohydric hydroxy acid and monohydric alkanol employed. According to the analytical data, the carboxy group content decreases as the amount of alcohol employed is increased. For example, the carboxy ester-lactones produced in accordance with the invention with glycolic acid but with no alcohol present in the reaction mixture show a carboxyl content equivalent to 6.35 mls. of N NaOH solution/gram of resin, whereas on repeating this reaction with suitable amounts of alcohol present, for example n-butyl alcohol, the carboxyl contents of the resulting modified products are in the range equivalent to about from 3.0 to slightly above 6.0 mls. of N NaOH solution/gram of product. However, those modified products in the range of carboxyl content equivalent to form 3.5 to 6.0 mls. of N NaOH solution/gram of product are preferred since they give the best adherence and least dye stain in photographic applications. The preferred resin products are all soluble in weak aqueous alkaline solutions, whereas the products outside the preferred range of equivalent carboxyl content tend to become insoluble below the lower limit of 3.5 or has greater tendency for dye stain above the upper limit of 6.0.

Typical starting interpolymers in step (a) of the process of the invention are those prepared from an unsaturated $\alpha,\beta$-dicarboxylic acid or its anhydride, such as maleic acid, citraconic acid, dimethylmaleic acid, or anhydrides or alkyl esters of 1–4 carbons thereof, fumaric acid, mesaconic acid, dimethylfumaric acid or alkyl esters of 1–4 carbons thereof, or similar well-known dicarboxylic acid and a vinyl organic acid ester such as vinyl acetate, vinyl propionate, vinyl benzoate or the like. Such interpolymers are then converted to a mixed alkyl ester and carboxy ester lactone by heating at reaction temperature with a mixture comprising a monohydric hydroxy acid and monohydric alkanol as previously defined. The preferred acid is of the lactic acid series. Thus, suitable hydroxy acids include glycolic acid, lactic acid, hydroxybutyric acid, hydroxyvaleric acid and hydroxycaproic acid. Other monohydric hydroxy acids such as malic acid can also be employed. Suitable monohydric alkanols include methanol, ethanol, propanol, isopropanol, n-butanol, n-hexanol, 2-ethyl-1-hexanol, decanol, dodecanol, and the like. As previously mentioned, in the treatment of the initial interpolymer with the hydroxy acid and the alcohol, the acyl groups are removed. The carboxylic acid or anhydride groups are esterified with the hydroxy acid to give carboxy ester groups and with the alcohol to give alkyl ester groups and at the same time an inner condensation takes place to give lactone groups. The reaction embodying this invention is carried out in the presence of a strong acid such as a mineral acid catalyst having an acidity of the order of sulfuric acid. Thus, the acid employed can be sulfuric acid, hydrochloric acid, and the like.

The above reaction can be effected in a solvent medium using any of the well-known organic solvents which do not have a reacting group. Alternately, the reaction can be effected in a partially aqueous medium and this is particularly desirable although not necessary when treating an anhydride interpolymer. Also, the reaction temperature is not critical although elevated temperatures of the order of 60 to 100° C. are usually employed. Higher temperatures, of course, can be used, if desired, but are usually not necessary. In effecting the reaction, the hydroxy acid and alcohol are desirably employed in excess, for example, in at least 2 molar proportions for each molar proportion of the interpolymer. In some cases, it may be desirable to employ the hydroxy acid and alcohol in larger amounts of as much as 10 or even 25 molar proportions to each molar proportion of the interpolymer. In the production of these resins, the process can be carried out either batchwise or in continuous fashion in accordance with known chemical practice.

For preparing the ammonium and alkali metal salts of the above-described resinous carboxy ester-lactone, the reaction mixture of step (a) is poured into a nonsolvent thereby precipitating a soft and partially fibrous product, which is then separated and washed free from mineral acid. The preferred nonsolvent for the precipitation and washing is water. The washed product is then dried or can be used directly, if desired, in carrying out step (b) of the process of the invention. However, the preferred procedure is to disperse the dried product in water wherein it becomes soluble as more and more of the carboxyl groups are neutralized and converted to the salt, or dissolved in acetone for the conversion. In either case, a dope is obtained from which the salt product can be separated by conventional means such as evaporation and precipitation into a nonsolvent for the salt product. The concentration of dried product in the water or in the acetone can vary widely but for practical considerations a concentration of about from 3–15% by weight is preferred. The ammonium and alkali metal hydroxides are added to the suspensions or solutions in aqueous forms in an amount just sufficient to convert the required percentage of free carboxyl groups to the corresponding salt radicals. Advantageously, the ammonium or alkali metal hydroxide solution is added at such rate and with such vigorous stirring that the reagent becomes quickly distributed throughout the reaction mixture without build-up of excessively high pH at any time. This value should not exceed 8, and preferably it should not be greater than 7. Higher pH values cause rupture of the lactone rings which is not at all desired. The temperature of reaction is not critical but preferably is carried out under conditions at or near normal room temperatures. The concentration of the ammonium or alkali metal hydroxides in their aqueous solutions likewise is not critical, but preferably from about 1–10% by weight for practical operating requirements.

The invention is further illustrated by the following detailed examples of preferred embodiments thereof which are not intended to limit the scope of the invention unless otherwise specifically indicated.

*Example 1*

The preparation of interpolymers of vinyl organic acid esters and unsaturated α,β-dicarboxylic acids are well known in the art. A typical polymerization is illustrated in the preparation of a vinyl acetate-maleic anhydride interpolymer. Thus 500 g. of maleic anhydride and 500 cc. of vinyl acetate were mixed together and warmed at 60° C. until the anhydride had dissolved. Thereafter, 0.35 g. of benzoyl peroxide was added to the solution and the temperature was gradually raised to 80° C. over a period of about 2 hours. After vigorous reaction had subsided, the reaction mixture was heated at 80° C. for an additional few minutes and then cooled and diluted with 3 liters of acetone. The interpolymer was precipitated out by pouring the acetone solution into cool water and the resulting white interpolymer was squeezed and dried in air. Other well known interpolymers of vinyl organic acid esters and unsaturated α,β-dicarboxylic acids can be prepared in a similar manner in accordance with well known practice and are suitable for use in practicing this invention.

*Examples 2–7*

These examples relate to process (*a*) for preparing the intermediate resinous carboxy ester-lactones.

(2) In a 5-liter flask equipped with a reflux condenser and stirrer were placed 1390 mls. of dioxane, 940 mls. of 70% glycolic acid, 450 mls. of n-butyl alcohol and 300 g. of vinyl acetate-maleic anhydride heteropolymer ({n}=0.21). The suspension was stirred until a smooth brown dope was obtained. To this was added 108 mls. of concentrated sulfuric acid dropwise. The slightly lighter colored dope was stirred and heated on a steam bath overnight, at the end of which time, it was cooled and diluted with acetone to precipitation viscosity. The light amber colored dope was poured into distilled water with stirring to obtain a soft and partially fibrous product. The polymer was stirred, with repeated changes of distilled water, until free from mineral acid. During this time it hardened and broke apart readily. It was dried in an air oven at room temperature to give 240 g. of a cream-colored product soluble in dilute base such as aqueous sodium carbonate. Direct titration in 1:1 acetone-water (200 ml./g.) with N/2 NaOH to a phenolphthalein endpoint indicated a carboxyl content equivalent to 4.84 mls. of N NaOH solution/gram of resin.

(3–7) The above procedure was repeated except that a number of other alcohols were substituted in place of the n-butyl alcohol.

*Examples 8–16*

These examples illustrate the effect of variation in the amount of n-butyl alcohol used in the reaction mixture for preparing the intermediate resinous carboxy ester-lactone resins of the invention.

In a 12 liter flask equipped with a reflux condenser, stirrer and dropping funnel were placed 1850 mls. of dioxane, 1250 mls. of glycolic acid, n-butyl alcohol in various amounts from 0 to 1200 mls., and 400 gms. of vinyl acetate-maleic anhydride heteropolymer. This represents the intermediate that has been water precipitated and centrifuged and had a moisture content of about 45% by weight based on content of moist polymer. The suspension was stirred until a smooth dope was obtained. To this was added dropwise 145 mls. of concentrated sulfuric acid. The slightly lighter colored dope was stirred and heated on a steam bath overnight, at the end of which time, it was cooled and diluted with acetone to precipitation viscosity. The pale yellow colored dope was poured into distilled water with stirring to obtain a soft, fibrous, and light cream colored product. The polymer was stirred with repeated changes of distilled water, until free from mineral acid. It was dried in an air oven at room temperature to yield a fibrous light cream-colored product soluble in dilute base such as aqueous sodium carbonate or ordinary photographic developers. Direct titration in 1:1 acetone-water (200 ml./g.) with N/2 NaOH to a phenolphthalein endpoint was used to determine the carboxyl content.

*Examples 17–23*

These examples relate to process (*b*) for preparing the final ammonium and alkali metal salts of the invention.

(17) A stock dope was prepared by dissolving 100 g. of carboxymethyl butyl resinic lactone of a vinyl acetate-maleic anhydride interpolymer (free carboxyl group content equivalent to 5.1 mls. of N NaOH solution/gram resin and prepared according to the process of Example 11) in 900 g. of acetone. To 300 g. portions of this dope were added 300 g. of a cold aqueous solution of sodium hydroxide containing the amount of sodium hydroxide given in the following table, at such a rate and with such vigorous stirring that the alkali was quickly distributed throughout the dope without build-up of regions of high pH. No precipitation of polymer occurred though the dope did go through an increase in viscosity. Clear, moderately viscous dopes with the following pH's were obtained. After standing for four days the pH's of the dopes remained essentially unchanged.

| Sample | Grams NaOH | pH | Percent Carboxyl Groups Neutralized |
|---|---|---|---|
| A | 3.0 | 5.24 | 49 |
| B | 4.0 | 5.37 | 65 |
| C | 5.0 | 5.76 | 82 |

The pH's may be further adjusted by the careful addition of base before coating. At pH's up to about 7–8 the dopes appear to be stable for prolonged periods of time. If raised too high, the pH slowly drops due to opening of the lactone ring. If acidified, immediate precipitation occurs indicating that the lactone ring is intact. The corresponding polymer, with the lactone ring opened, is soluble in water in the acid form.

(18) Using the same procedure and precautions as in above Example 17, 1200 g. of cold dilute ammonium hydroxide, containing 32 g. of concentrated ammonium hydroxide, were added to 1200 g. of a dope consisting of 980 g. of acetone and 120 g. of the same starting resinic polymer as in above Example 17. The mixing occurred smoothly and the final dope had a pH of 5.55, and an indicated neutralization of over 80% of the free carboxyl groups to the ammonium salt radical. To remove the acetone, 2 kg. of the above dope were evaporated to 887 g. under vacuum at 50° C. This residual aqueous dope was transferred to a bottle. The weight of dope and distilled water rinses was 1071 g. for a solids content of 9.35% by weight. The pH was 4.24.

(19) A series of three 50 g. samples of carboxymethyl butyl resinic lactone, prepared according to the general procedure described in Examples 9–16 and having a free carboxyl content equivalent to 5.18 mls. of N NaOH solution/gram resin, were dissolved in acetone to make in each case 400 g. of solution. To the respective solutions was added the amount of pellet sodium hydroxide in water to make weight of solution, indicated in the table below, in the manner described in Example 17. The pH of the resulting dope was measured, as well as the behavior of these dopes on dilution with water and with methanol. The results are given below.

| Sample | G. NaOH | Weight of Solution, g. | Percent Resin Solids of Resulting Dope | Percent Carboxyl Neutralized | pH | Dilutable By— | |
|---|---|---|---|---|---|---|---|
| | | | | | | H₂O | MeOH |
| A | 2 | 100 | 10 | 19.3 | 4.88 | Yes | Yes. |
| B | 4 | 200 | 8.3 | 38.6 | 4.96 | Yes | Yes. |
| C | 6 | 200 | 8.3 | 57.9 | 5.29 | Yes | Yes. |

It should be pointed out that in the neutralization, it is only necessary in the initial addition of base to add sufficient alkali to convert the inherently hydrophobic unneutralized starting resin to the inherently hydrophilic sodium product. The pH may then be readily adjusted as needed by the addition of aqueous sodium hydroxide if some simple precautions are taken. The lactone ring appears to be stable up to a pH of about 8. It is therefore desirable that the solution be vigorously stirred during the alkali addition and that the alkali addition be slow enough to prevent the pH of the solution from rising above a pH of 8, preferably not much above 7. Calculation indicates a —COONa radical content of Samples A, B and C to be equivalent to 1.0, 2.0 and 3.0 mls. of N NaOH solution/gram of the sodium salt resin.

(20) A sodium salt solution was prepared by the procedure of Examples 17 C, using the same intermediate resin lactone containing free carboxyl groups equivalent to 5.1 mls. of N NaOH solution/gram of resin, and the acetone was removed therefrom under vacuum at 50° C. Then 200 g. of the residual water solution was poured in a fine stream into three liters of acetone with stirring. The polymer precipitated in a nicely fibrous form. The precipitate was extracted with 3 one-liter portions of acetone, filtered onto a Buchner funnel after each extraction, and then dried at room temperature under a constantly applied vacuum. The yield was 19 g.

Titrations of this product in both 1:1 acetone and water and in 1:1 pyridine and water showed that it had a residual free carboxyl group content equivalent to 0.83 ml. of N NaOH solution/gram and a —COONa radical content equivalent to approximately 4.3 mls. of N NaOH solution/gram. The calculated theoretical for the free carboxyl content remaining in the polymer after the neutralization by the addition of sodium hydroxide in the proportions of 16 g. of NaOH/100 g. of the unneutralized starting resinous polymer is approximately equivalent to 1.00 mls. of N NaOH solution/gram of the resinous polymer.

(21) 100 g. of a carboxymethyl butyl resinic lactone prepared according to the general procedure described in Examples 9–16 and having a free carboxyl content equivalent to 5.13 mls. of N NaOH solution/gram resin, previously pulverized to pass a 20-mesh sieve, was suspended in 700 ml. of distilled water. The suspension was vigorously stirred by 2 three-inch propellers, driven by an electric mixer. The glass electrodes of a pH meter were immersed in the slurry. The pH before the addition of alkali was 3.9. Over a period of 1½ hours a cold solution of 16 g. of sodium hydroxide in water to make 500 g. was added dropwise. The pH during most of the addition remained between 3.9 and 4.1 and at the end of the addition of the alkali was 4.23. Stirring was continued for an additional one hour. A very frothy dope was obtained. This was filtered through filter paper by suction. Except for a few pieces, filtration was complete. The pH was now 4.22.

Then 200 g. of the above dope was poured into three liters of acetone with stirring. The fibrous precipitate that was obtained was extracted several times with one-liter portions of fresh acetone, filtering after each extraction, and then dried under a constantly applied vacuum at room temperature. Seven and three-tenths g. of polymer were obtained. Duplicate one-gram samples of this polymer were dissolved in 50 ml. of distilled water, diluted with 50 ml. of acetone, and titrated with 0.495 N sodium hydroxide solution to a phenolphthalein indicator endpoint. An average of 2.50 mls. of this alkali was required, indicating a free carboxyl content equivalent to 1.24 mls. of N NaOH solution/gram of resin product. The calculated theoretical free carboxyl content for the amount of sodium hydroxide added in the reaction is approximately equivalent to 1.04 mls. of N NaOH solution/gram of resin, indicating thereby that in the course of the above neutralization reaction very few of the lactone rings were opened.

(22) 100 g. of a carboxymethyl butyl resinic lactone, prepared according to the general procedure described in Examples 9–16 and having a free carboxyl content equivalent to 5.18 mls. of N NaOH solution/gram resin, were placed in a 3-quart mill with 600 ml. of distilled water. The suspension was milled for 20 minutes to break up pieces. To the milled slurry was added, dropwise from a dropping funnel at the rate of 2 drops per second, a solution of 160 g. of 10 percent sodium hydroxide diluted to 300 g. of distilled water. Forty minutes were required for the addition of the alkali. Milling was continued until solution was essentially complete. All the polymer had dissolved except a few pieces on the walls of the mill. The pH was 4.32.

Then 200 g. of the above dope was precipitated, washed, and dried as in the previous example. A total of 13 g. of fibrous polymer was isolated. Titration as in the above example indicated a carboxyl content of 0.95 meq./g. The theory for the above polymer is approximately 1.08 meq./g., again indicating that little if any lactone rings had opened.

(23) To a solution of 150 g. of carboxymethyl butyl resinic lactone, having a free carboxyl content equivalent to 5.1 mls. of N NaOH solution/gram resin, in acetone to make 1500 g. of solution was added with vigorous stirring to a chilled solution of 15 g. of lithium hydroxide in one liter of water. A clear, smooth dope was obtained having a pH of 5.56. Titration of the lithium salt resin product indicated that approximately 80 percent of the carboxyl groups had been converted to —COOLi radical.

By substituting for the carboxymethyl butyl resinic lactone in above Examples 17–23, a like amount of other of the mentioned lactones such as prepared in accordance with Examples 3–7, there are obtained the corresponding sodium and lithium salts thereof which also are soluble in aqueous solutions. While Examples 17–23 specify neutralization with just the ammonium, lithium, and sodium hydroxides, it will be understood that other alkali metal hydroxides function similarly in the process of the invention, for example, potassium hydroxide. Also similar salts of mixed carboxy ester-lactones are contemplated. The intermediate unneutralized mixed carboxy ester-lactones therefor can be produced by the processes of Examples 2–7 by substituting a like amount of mixtures of two or more alcohols for the single specified alcohol. A further modification within the scope of the invention is the ammonium and alkali metal salts of mixed carboxy ester-lactones produced according to the processes of Examples 2-7, but employing therein a like amount of mixtures of one or more of the specified hydroxy acids simultaneously with one or more of the mentioned monohydric alcohols.

Although the invention has been described in considerable detail with reference to certain preferred embodiments thereof variations and modifications can be effected without departing from the spirit and scope of the invention as described hereinabove and as defined in the appended claims.

What I claim is:

1. In the process for making a salt of a resinous mixed ester-lactone of the reaction product of (1) from 15–30% by weight of an interpolymer of a vinyl organic acid ester and an unsaturated alpha-beta-dicarboxylic acid compound from the group consisting of maleic acid, citraconic acid, dimethylmaleic acid and anhydrides and alkyl esters of 1–4 carbon atoms thereof, fumaric acid, mesaconic acid, dimethylfumaric acid and alkyl esters of 1–4 carbon atoms thereof, (2) from 35–65% by weight of a monohydroxy acid of the formula $C_nH_{2n}(OH)(COOH)_x$ wherein $n$ is an integer of from 1–5 and $x$ is an integer of from 1–2 and (3) from 10–45% by weight of an alkanol of the formula R—OH wherein R represents a member selected from the group consisting of an alkyl group containing from 1–12 carbon atoms, a phenylalkyl group wherein the said alkyl group contains from 1–4 carbon atoms and a tolylalkyl group wherein the said alkyl group contains from 1–4 carbons, said lactone containing —$COOC_nH_{2n}COOH$ groups, —$COOC_nH_{2n}COOR$ groups, and —COOH groups and —COOR groups attached directly to the carbon chain of said lactone wherein $n$ and R are as above defined and wherein the total free carboxyl groups are equivalent to from 3.5–6.0 mls. of N NaOH solution/gram of the said lactone, the steps which comprise dissolving said lactone in solvent and adding to the resulting solution just sufficient alkaline reagent to adjust the solution to a pH within the range of 5–8 whereby said lactone is converted to a hydrophilic salt and the lactone rings thereof remain substantially intact, the alkaline reagent having been selected from the group consisting of ammonium hydroxide and the alkali metal hydroxides.

2. In the process for making a salt of a resinous mixed ester-lactone of the reaction product of (1) from 15–30% by weight of a vinyl acetate-maleic anhydride interpolymer, (2) from 35–65% by weight of glycolic acid and (3) from 10–45% by weight of ethanol, said lactone containing —$COOCH_2COOH$ groups, —$COOCH_2COOC_2H_5$ groups, —COOH groups and —$COOC_2H_5$ groups attached directly to the carbon chain of said lactone wherein the total free carboxyl groups present are equivalent to from 3.5–6.0 mls. of N NaOH solution/gram of the said lactone, the steps which comprise dissolving said lactone in solvent and adding thereto just sufficient aqueous sodium hydroxide to adjust the solution to a pH within the range of 5–8 whereby said lactone is converted to a hydrophilic salt and the lactone rings thereof remain substantially intact.

3. In the process for making a salt of a resinous mixed ester-lactone of the reaction product of (1) from 15–30% by weight of a vinyl acetate-maleic anhydride interpolymer, (2) from 35–65% by weight of glycolic acid and (3) from 10–45% by weight of n-butanol, said lactone containing —$COOCH_2COOH$ groups, $$—COOCH_2COOC_4H_9$$

groups, —COOH groups and —$COOC_4H_9$ groups attached directly to the carbon chain of said lactone wherein the total free carboxyl groups present are equivalent to from 3.5–6.0 mls. of N NaOH solution/gram of the said lactone, the steps which comprise dissolving the said lactone in solvent and adding thereto just sufficient aqueous sodium hydroxide to adjust the solution to a pH within the range of 5–8 whereby said lactone is converted to a hydrophilic salt and the lactone rings thereof remain substantially intact.

4. In the process for making a salt of a resinous mixed ester-lactone of the reaction product of (1) from 15–30% by weight of a vinyl acetate-maleic anhydride interpolymer, (2) from 35–65% by weight of glycolic acid and (3) from 10–45% by weight of n-hexanol, said lactone containing —$COOCH_2COOH$ groups, $$—COOCH_2COOC_6H_{13}$$

groups, —COOH groups and —$COOC_6H_{13}$ groups attached directly to the carbon chain of said lactone wherein the total free carboxyl groups present are equivalent to from 3.5–6.0 mls. of N NaOH solution/gram of the said lactone, the steps which comprise dissolving the said lactone in solvent and adding thereto just sufficient aqueous sodium hydroxide to adjust the pH of the solution to within the range of 5–8 whereby said lactone is converted to a hydrophilic salt and the lactone rings thereof remain substantially intact.

References Cited in the file of this patent
UNITED STATES PATENTS
2,757,153    Bowen _____ July 31, 1956